United States Patent [19]

Berry et al.

[11] 4,417,322

[45] Nov. 22, 1983

[54] REPORT GENERATION CONTROL SYSTEM FOR TEXT PROCESSING MACHINES

[75] Inventors: Richard E. Berry, Georgetown; John H. Wilson, Austin, both of Tex.

[73] Assignee: International Business Machines Corporation, Armonk, N.Y.

[21] Appl. No.: 273,561

[22] Filed: Jun. 16, 1981

[51] Int. Cl.³ .............................................. G06F 3/12
[52] U.S. Cl. ..................................... 364/900; 364/200
[58] Field of Search ... 364/200 MS File, 900 MS File

[56] References Cited

U.S. PATENT DOCUMENTS 4,086,660  4/1978  McBride ........................... 364/900

Primary Examiner—Gareth D. Shaw
Assistant Examiner—Tim A. Wiens
Attorney, Agent, or Firm—John W. Henderson, Jr.

[57] ABSTRACT

A report generation control system for operating a text processor to produce output reports containing inter-report summary data from data processing-type files. The system is compatible with text pagination functions and is useable by a text entry/revision operator with no programming skills. The system permits the operator to describe the desired report by keying an example page of the report in the exact desired format and then editing the example page by replacing the required variable file data examples with descriptive instructions and by inserting summary instructions. The system scans the edited example page for instructions, breaks it down into logical components and compiles the components into program routines which will produce the desired output report.

9 Claims, 8 Drawing Figures

SALES ANALYSIS BY TERRITORY

SALESMAN: SALESMAN1                         TERRITORY: TERR#

ACCOUNT                            ORDER TOTAL

CUSTOMER1                                         99999.99
CUSTOMER2                                         99999.99
   .                                                 .
   .                                                 .
   .                                                 .

TERRITORY TOTAL: $999,999.99

SALESMAN: SALESMAN2                         TERRITORY: TERR#

ACCOUNT                            ORDER TOTAL

.                                                 .
   .                                                 .
   .                                                 .
   .                                                 .

TERRITORY TOTAL: $999,999.99

GRAND TOTAL: $999,999.99

```
1         2         3         4         5         6         7
8901234567890123456789012345678901234567890123456789012345678
(FRP)
                    SALES ANALYSIS BY TERRITORY
(DCG,TERRITORY_NUM)
F

SALESMAN:(INS,SALESMAN_NAME)        TERRITORY: (INS,TERRITORY_NUM)

ACCOUNT                         ORDER TOTAL (RCD)
F
(INS,ACCT_NAME)                 (INS,ORDER_AMT)
(CGS)
(TOT,A01,ORDER_AMT)

TERRITORY TOTAL: (INS,A02,A2)

(FRS)
F
(TOT A02,ORDER_AMT)

GRAND TOTAL: (INS,A02,A2)
```

FIG. 7

```
              SALES ANALYSIS BY TERRITORY

SALESMAN:  P. JOHNSON               TERRITORY: 15

ACCOUNT                       ORDER TOTAL

F. SHAW, AND SON                           1057.15
THOMAS ASSOC.                               385.00

TERRITORY TOTAL: $1,442.15

SALESMAN:  T. ABRAMS                TERRITORY: 25

ACCOUNT                       ORDER TOTAL

MCFARLAND'S INC.                          19387.00
WESTMOR, CORP.                              685.50
NBI ASSOC.                                 2319.85

TERRITORY TOTAL: $22,392.35

GRAND TOTAL: $23,834.50
```

FIG. 8

REPORT GENERATION CONTROL SYSTEM FOR TEXT PROCESSING MACHINES

DESCRIPTION

1. Field of the Invention

This invention relates generally to text processing system control for report generation and more particularly to means and methods for enabling a non-programmer to produce a control system to merge text data and file data to create an output report on a text processing system.

2. Description of the Prior Art

Many prior art text processing systems provide a capability for pagination of text data for printing or display. Pagination is done typically through preprogrammed page lengths but some text processing systems provide additional capability to enable the operator to specify page length by number of lines of text per page.

Pagination functions typically process variable length input lines of text into uniform pages of equal length lines, keep related text on a single page, allow text lines from other documents to be inserted, and make hyphenation decisions or assist an operator of the text processing system in making hyphenation decisions when a word crosses a line ending boundary. The pagination functions are based on the concept of paginating a text document entered by an operator to produce an attractive appearing letter, for example, with equal length lines, etc. An extension of pagination, offered by some text processing systems, allows variable data from a data processing-like file to be merged with a text document to generate a composite document, for example, personalized letters. This capability is generally referred to as "merge file/text" or "auto letters".

Under the "merge file/text" technique a "shell" text document, called a "merge control document", contains the constant text to appear in each letter and some form of instructions to the text processing system specifying how data from the file is to be inserted so as to tailor each letter, for example, with a name and address. The text processing system then performs a repetitive pagination of the shell document, once for each record in the file, after substituting the variable information from the current record. The result is a number of tailored letters equal to the number of records processed.

There has developed a requirement in the text processing market for a system to produce summary reports from the same file data. Current approaches typically involve data processing type solutions such as high level languages and compilers (e.g. BASIC, PL1, COBOL) which run co-resident with the pagination type of word processing function but require a "programmer" to create and maintain.

SUMMARY OF THE INVENTION

The present invention discloses a control system for operating a text processing system which provides an operator interface, useable by a text entry/revision operator with no programming skills for the creation of summary reports from data processing type files and is compatible with and complimentary to the pagination function. The operator may describe the desired report to the system by keying a text document example of the report editing the example report by replacing the examples of variable data with descriptive instructions to cause file data substitution and by inserting instructions which identify sections of the report in a predetermined manner. This creates a file report merge control document which is an image of the desired report and which the control system uses in a merge file/text task to generate the desired report from the records in the file.

BRIEF DESCRIPTION OF THE DRAWING

FIG. 6 illustrates an example report to be edited into a file report merge control document.

FIG. 7 illustrates the file report merge control document of FIG. 6 after editing with the appropriate instructions to the control system.

FIG. 8 illustrates a report generated using merge control document of FIG. 7.

DESCRIPTION OF THE PREFERRED EMBODIMENT

Figure 1:
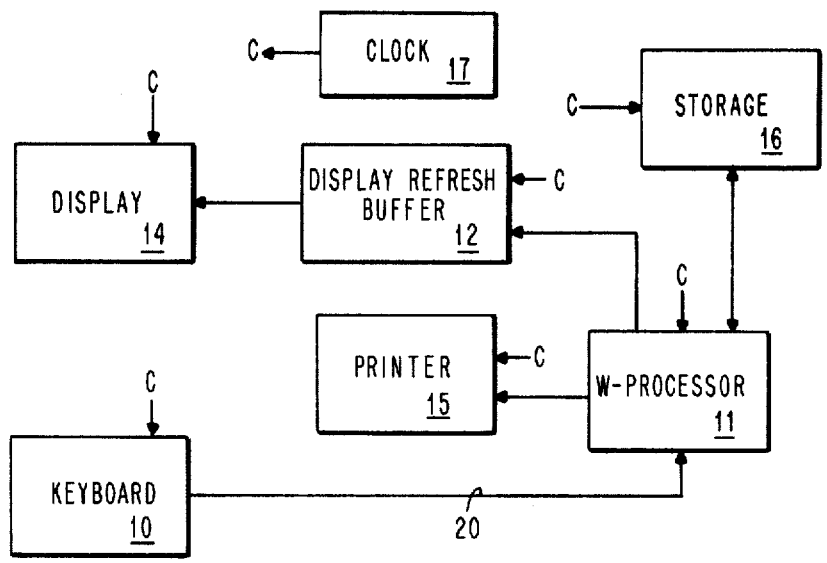
FIG. 1 is a block diagram of an interactive text processing system utilizing the present invention.

The invention will now be described as embodied in an interactive text processing system of the type shown in FIG. 1. As shown in FIG. 1, the text processing system illustrated therein comprises a keyboard 10, a microprocessor 11, a display refresh buffer 12, a display device 14, a printer 15, and an auxiliary disk storage device 16. A clock 17, for keeping the various components of the system in synchronism, is also shown in FIG. 1 and is effectively coupled to each of the units.

Keyboard 10 comprises a normal set of graphic symbol keys such as letters, numbers, punctuation marks, and special character keys, plus text format or control keys like carriage return, tab, index, etc. In addition, the keyboard 10 includes a second set of control keys for issuing special control commands to the system. The control keys include cursor movement keys, keys for setting the keyboard 10 into a number of different modes, etc.

Figure 2:
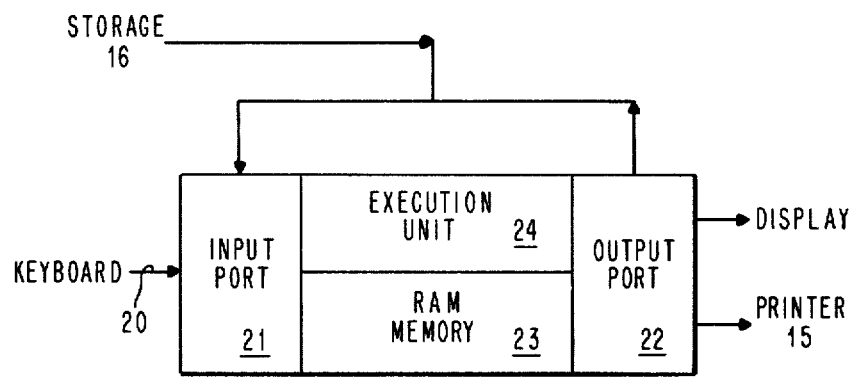
FIG. 2 is a functional diagram of the microprocessor shown in FIG. 1.

The keyboard 10 is connected to the microprocessor 11 by means of a bus 20. The microprocessor 11, as shown in FIG. 2, comprises an input port 21, an output port 22, a random access memory 23, and a process execution unit 24.

Figure 3:
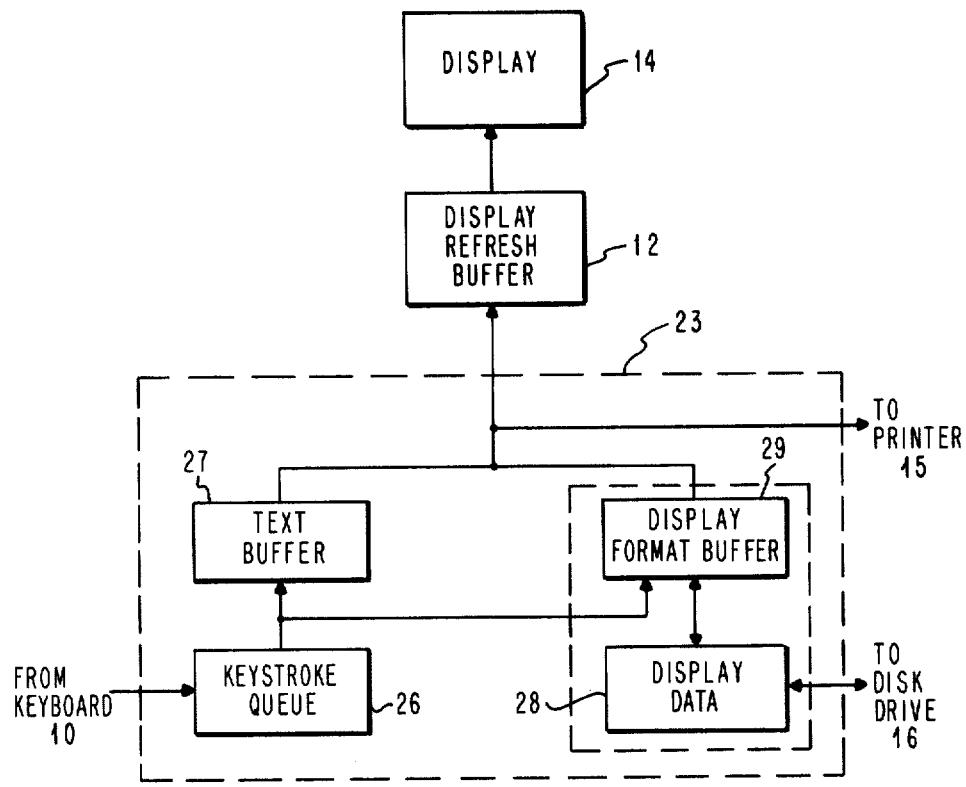
FIG. 3 is a functional diagram illustrating the data flow path between portions of the memory and the microprocessor and the display refresh buffer.

Functionally, memory unit 23 stores both instructions and data in specified sections which will be described in more detail later on in the specification. Data is entered into memory 23 from the keyboard 10 as bytes of binary information through input port 21. As shown in FIG. 3, the section of RAM 23 which receives the keystroke data from the keyboard 10 is designated keystroke queue 26. Data to be displayed is transferred by a series of instructions from queue 26 to the text buffer section 27 and then to the display refresh buffer 12 through output port 22 of the microprocessor 11. This is achieved in a conventional way by the microprocessor 11 executing a series of move instructions.

The microprocessor 11 may be an IBM Series 1, INTEL model 8086, or any of the recognized functionally equivalent, currently available microprocessors.

The display refresh buffer 12 is shown as a separate buffer connected between the output port 22 and the display device 14. Buffer 12, in practice, is normally a part of the display device 14 and functions to control the generation of characters on the screen by the beam as it traces a series of horizontal lines across the screen.

The output port 22 also supplies data stored in memory 23 to the printer 15 and disk storage unit 16, each of which may have their own internal buffers which are not shown. Commands to transfer data from the random access memory 23 to the printer 15 or storage unit 16 are sent to the microprocessor 11 by the operator from the keyboard 10.

Printer 15 may be any suitable printer known in the art. In most text processing systems, the printer 15 is basically a standard input/output terminal printer having a type ball element or a daisy-wheel print element.

Disk storage 16 may also be any suitable disk storage device which is capable of storing serial by byte data supplied to it at determined section address locations, each of which are randomly addressable to the microprocessor 11 to retrieve the data. Spatially related data supplied from disk drive 16 is stored in the display data area 28 of the memory 23 in encoded form. The other section of memory 23 shown in FIG. 3 is the display format buffer area 29 which is involved in the handling of spatially related data in decoded form in accordance with the method of the present invention.

Figure 4:
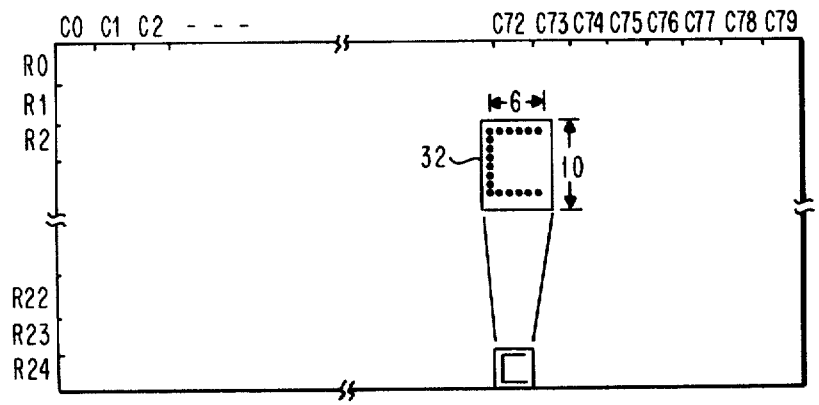
FIG. 4 is a diagrammatic view of the display shown in FIG. 1.

FIG. 4 is a schematic representation of the screen of display device 14. As shown in FIG. 4, the screen has, for example, the capability of displaying 25 lines of characters where each line consists of 80 character column positions. In practice, one character position consists of a matrix of dot positions or picture elements sometimes referred to as pels. A typical character matrix for a display of the type represented by device 14 would be a matrix of six wide by ten high pels, which has been designated by reference character 32 in FIG. 4. The interaction of the refresh buffer 12 and the display 14 is to convert the characters stored at a location in the buffer 12 to the corresponding character as formed in a 6×10 dot matrix at the equivalent location on the display 14. Display 14 generally is provided with its own set of electronics to achieve that conversion. The microprocessor 11 need only supply the address and load the buffer 12 with the appropriate characters.

The disk storage device 16 also is generally provided with its own set of electronics for converting a byte of data supplied from the display data area 28 of memory 23 through the output port 22 to a serial by bit stream of data to be recorded at a predetermined sector of the one addressed concentric recording track on the disk. Data from the device 16 is supplied to the microprocessor 11 serial by byte from the addressed sector and storage tracks when requested.

It will be understood that all of the above described functions and interactions involving the microprocessor 11 are achieved through suitable control programs which are also stored in memory 23 and which are called into operation in response to data from the keyboard 10 or interrupt signals generated by the various components of the system shown in FIG. 1.

Figure 5:
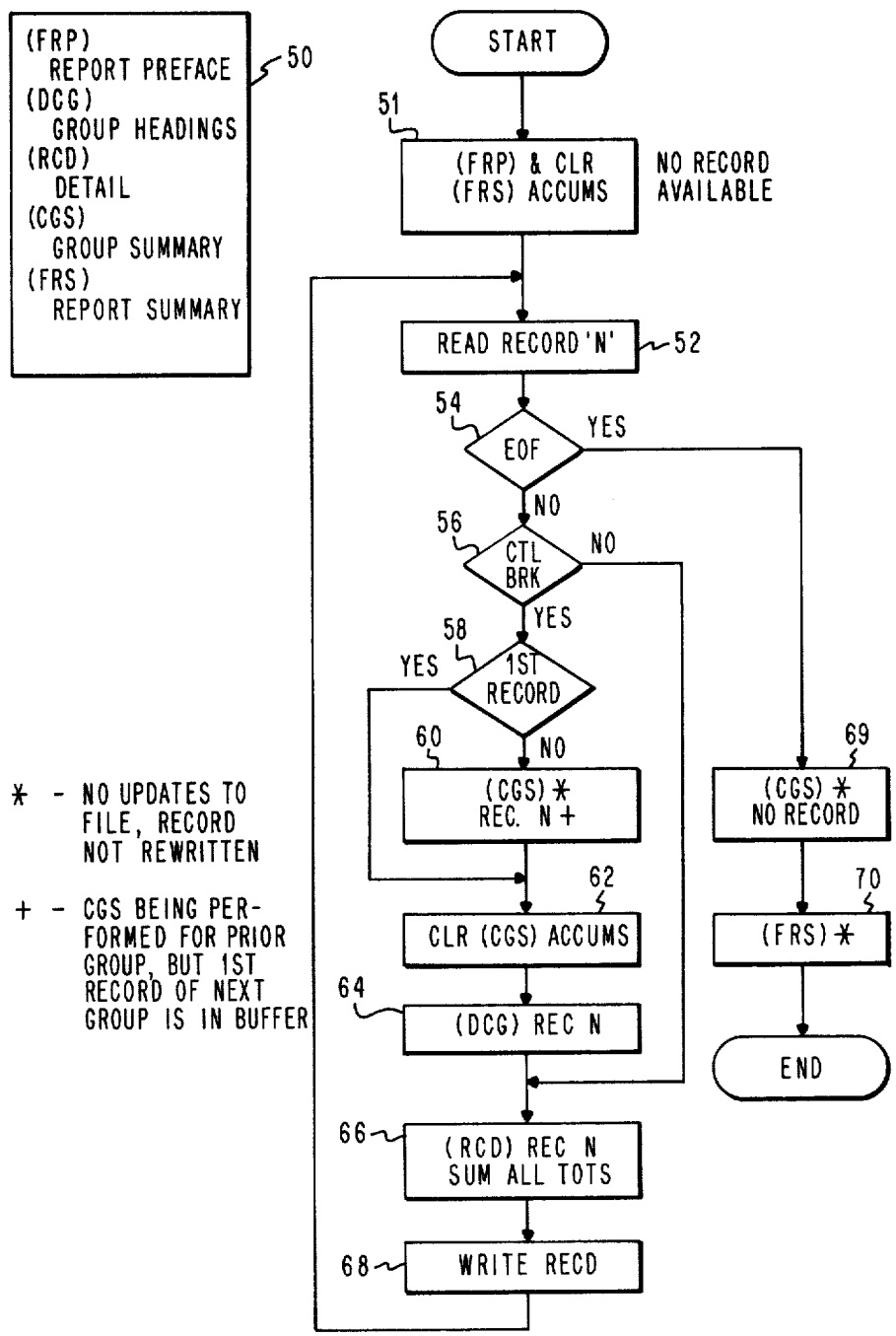
FIG. 5 is a flow diagram of the control routine of the present invention.

FIG. 5 is a flow diagram illustrating the operation of the control routine of the present invention. However, prior to discussing the flow of the control routine and its combination with the text processing system of FIG. 1, an overview of the theory underpinning the operation of the control system is in order. The problem presented was how to produce a report which merges text and file records and produces summary information without requiring programming skills on the part of the text processing system operator. The present solution includes providing a control routine for operating the text processing system which enables an operator of the text processing system to type an example page of the desired report and to substitute predetermined descriptive instructions in the example page for providing interrecord calculations and for specifying the body text format of the generated reports. The example report page is shown in FIG. 6 and will be edited into the File Report Merge Control Document shown in FIG. 7. The control system provides for defining the file control sections of the file report merge control document using five instructions to describe the report structure and one instruction to request system maintained totals and subtotals. These instructions are as follows:

| | |
|---|---|
| File Report Preface [FRP] | Identifies a section of the file report merge control document which is to be generated only once, at the beginning of the report, and intended to be used for cover letters, report title pages, etc. |
| Define Control Group [DCG] | Identifies a section of the file report merge control document which is to be generated at the beginning of each group of related records, and specifies the criteria to be used in identifying the group (e.g., "All accounts for a particular salesman"). Intended to be used for heading information concerning the following group of records, etc. The text contained within this section is generated each time there is a "control break" (i.e., a transition from one group of related records to the next) and after any Control Group Summary has been produced for the prior group of records. |
| Record Detail [RCD] | Identifies a section of the file report merge control document which is to be generated for each record. This section typically consists of file data insertion instructions, to insert the fields from the current record, perform line totals, etc. |
| Control Group Summary [CGS] | Identifies a section of the file report merge control document which is to be generated each time there is a control break, prior to the generation of headings for the next group. This section typically consists of headings and/or titles for summary information on |

| | |
|---|---|
| File Report Summary [FRS] | the group of records just processed, and Total instructions specifying accumulators used to maintain the totals for the group. If this section is specified, a corresponding Define Control Group section must be specified, even if it contains no text to be generated (i.e., The Define Control Group instruction establishes the criteria for the "control break" which triggers the Control Group Summary). This section of the file report merge control document contains text which is generated when an "end of file" condition occurs in the Primary input file. When record selection is being performed it signals the end of qualified records. This section is intended to contain headings and/or titles for summary information on all records processed, and Total instructions specifying accumulators used to maintain the totals for the file. |
| Total [TOT] | This instruction is used within the Control Group Summary and File Report Summary sections of a file report merge control document to request a system maintained total. When used within a Control Group Summary section, it performs a total for a field within the control group. As records within a group are read, the values of the specified field from each record are automatically summed in a specified "accumulator". During a control break, the summed value can be inserted into the report and the accumulator is reset in preparation for the next group of records. When used within a File Report Summary section, the Total instruction causes the field values from all selected records to be summed and allows the sum to be inserted when the File Report Summary is generated (i.e., at end of file). |

Now, referring back to FIG. 5, the flow of the control routine will be described. The block 50 shows the overall structure of a file report merge control document. This will be described in greater detail below with reference to file report examples. At block 51 the file report preface which shows a file report title for example is printed and the file report summary accumulators are cleared. Table 1 shows a program design language implementation (PDL) example of this block. At block 52, a first record is read and at block 54, a test is conducted to determine is the end of the record file has been reached. Assuming that the end of file has not been reached, at block 56 a test is conducted to determine if a control break has been reached. If no control break has been reached, then a branch is taken to block 66 where the details from the current record are inserted into the document and the totals are accumulated. Table 2 shows an example of a PDL routine for generating the record detail. At block 68 the updated record is written back into the file and a branch is taken back to block 52 to read the next record.

TABLE 1

DESCRIPTIVE-NAME=FILE REPORT OUTPUT INITIATOR

FUNCTION=Initiates file report generation, following report descriptor document compilation. Initiation includes report generation storage allocation, initialization of paginator-based input/output and record gen processes, and actual generation of report preface text (FRP).
BEGINPDL 010,010
   ALFTRGB (INITIATE REPORT OUTPUT) MAIN SEGMENT
   INVOKE RESTORE COMMON WORK AREAS (FTCCRRES)
   INCLUDE BEGIN INPUT/OUTPUT PROCESSING (FTRGB020)
   INCLUDE BEGIN PAGINATOR PROCESSING (FTRGB040)
   INCLUDE BEGIN REPORT PROCESSING (FTRGB050)
   INCLUDE PUT FIRST PAGE START FORMAT (FTRGB060)
   CALL GENERATE FRP TEXT OUTPUT -ALFTRGE-(CALL)
   SET FIRST DETAIL OUTPUT INDICATOR (#PGDA_BASE_DOCUMENT_START_PAGE TO 'FIRST')
   INVOKE SAVE COMMON WORK AREAS (FTCCRSAV)
   INCLUDE GENERATOR NORMAL RETURN PARAMETER (FTRGB140)
   RETURN TO MERGE FILE/TEXT MAINLINE (RETURN)
ENDSEGMENT ALFTRGB (INITIATE REPORT OUTPUT) ENDPDL

TABLE 2

DESCRIPTIVE-NAME=FILE REPORT DETAIL GENERATOR

FUNCTION=Generates report object document output associated with a single primary file record, including appropriate control group text when this record represents one or more report control breaks.
BEGINPDL 010,010
   ALFTRGC (GENERATE REPORT DETAIL) MAIN SEGMENT
   INVOKE RESTORE COMMON WORK AREAS (FTCCRRES) INCLUDE ALLOCATE WORK AREAS (FTRGC010) SET ASCENDING CONTROL GROUP INDEX (I=1)

```
DO WHILE (I) < =MAX CONTROL GROUP
   LEVEL CALL GET NEW DCG(I) CONTROL
   VALUE (PARSEEXP)
   ASSIGN=YES,
   CAPLIZE=NO,
   EXPTYP=(A,C,FLD),
   EDITING=YES,
   EXPLEN=RGWA___CONTROL___BREAK
      LENGTH,
   EXPRESS=RGWA___CONTROL___BREAK
      NAME,
   PAFDSYS=RGPL__PARALLEL__FILE__DE-
      SCRIPTOR SYSID,
   PRFDSYS=RGPL__PRIMARY__FILE__DE-
      SCRIPTOR_SYSID,
   SYMPAGE=RGPL_SYMBOLS_PAGE,
   SYMSYS=RGPL_WORK_DOC_SYSID,
   WORKBUF=WK_EXP_EVAL_WORK_BUF-
      FER@,
   KEYUPD=DISALLOW,
   EVAL=YES,
   PRREC@=RGPL___PRIMARY___RECORD
      ADDR,
   PAREC@=RGPL__PARALLEL__RECORD
      ADDR,
   MCDSYS=RGPL_SOURCE_DOC_SYSID,
   EXEC=YES
   IF EE RETURN CODE IS 'OK', THEN
      IF LEVEL (I) CONTROL BREAK, THEN IN-
         CLUDE PERFORM LEVEL (I) BREAK
         (FTRGC030)
      ELSE (NO LEVEL (I) CONTROL BREAK)
         INCREMENT CONTROL GROUP INDEX
         (I=I+1)
      ENDIF
      INVOKE FREE THE RESULT BUFFER
         (FTRGC070)
   ELSE (EXPRESSION EVAL FAILED)
      SET ABORT_PROCESS_CODE TO 'EX-
         PRESSION EVAL ERROR'
      TRANSFER TO ERROR PROCESSOR PGN
         -ALFTRGF-(XCTL)
   ENDIF
ENDDO
SET SOURCE_DOCUMENT_CURRENT_PAGE
   TO RGWA_RCD_TEXT_PAGE_NAME
CALL GENERATE RCD TEXT OUTPUT
   (ALFTRGE)
SET SOURCE_DOCUMENT_CURRENT_PAGE
   TO ZERO
SET DESCENDING CONTROL GROUP
   INDEX (J=MAX)
DO WHILE (J) > =(REPORT LEVEL IN-
   DEX=0) INCLUDE CALCULATE CGS(J)
   TOTALS (FTRGC040) DECREMENT CON-
   TROL GROUP INDEX (J=J-1)
ENDDO
IF FRS TOTALS REQUIRED, THEN INCLUDE
   CALCULATE FRS TOTALS (FTRGC045)
ENDIF
RESET FIRST DETAIL OUTPUT INDICATOR
INVOKE SAVE COMMON WORK AREAS
   (FTCCRSAC)
INCLUDE FREE WORK AREAS (FTRGC020)
ESTABLISH GENERATOR NORMAL RE-
   TURN PARAMETERS (FTRGC060)
RETURN TO MERGE FILE/TEXT MAINLINE
   (RETURN)
ENDSEGMENT ALFTRGC (GENERATE RE-
PORT DETAIL) ENDPDL
```

Assuming the next record causes a control break at block 56 then a test is conducted at block 58 to determine if the record just read is the first record. If not then a control group summary for the records just completed is generated at block 60. At block 62 the accumulators for the control group summary are cleared and at block 64 the control group headings are printed prior to beginning the next group of records. Table 3 shows a PDL routine for processing the control break.

TABLE 3

```
BEGINPDL 010,010
FTRGC030 (PERFORM CONTROL BREAK)
INCLUDED SEGMENT
   SET DESCENDING CONTROL GROUP
      INDEX (J=MAX)
   DO UNTIL (J) <CONTROL BREAK LEVEL (I)
      IF NOT FIRST DETAIL OUTPUT PROCESS,
         THEN
         ESTABLISH LAST BREAK RECORD DATA
            POINTERS
         SET SOURCE__DOCUMENT__CURRENT
            PAGE TO RGWA_CGS (J)_TEXT_PAGE
            NAME
         CALL GENERATE CGS (J) TEXT OUTPUT-
            ALFTRGE-(CALL)
         SET SOURCE__DOCUMENT__CURRENT
            PAGE TO ZERO
         RESTORE NEW BREAKRECORD DATA
            POINTERS
      ENDIF
      INCLUDE CLEAR CGS(J) TOTALS
         (FTRGC050)
      CALL GET NEW DCG(J) CONTROL VALUE
         (PARSEEXP)
         ASSIGN=YES,
         CAPLIZE=NO,
         EXPTYP=(A,C,FLD),
         EDITING=YES,
         EXPLEN=RGWA___CONTROL___BREAK
            LENGTH,
         EXPRESS=RGWA___CONTROL___BREAK
            NAME,
         PAFDSYS=RGPL__PARALLEL__FILE__DE-
            SCRIPTOR_SYSID,
         PRFDSYS=RGPL__PRIMARY__FILE__DE-
            SCRIPTOR_SYSID,
         SYMPAGE=RGPL_SYMBOLS_PAGE,
         SYMSYS=RGPL_WORK_DOC_SYSID,
         WORKBUF=WK_EXP_EVAL_WORK_BUF-
            FER@,
         KEYUPD=DISALLOW,
         EVAL=YES,
         PRREC@=PRIMARY_RECORD ADDR,
         PAREC@=RGPL___PARALLEL___RECORD
            ADDR,
         MCDSYS=RGPL_SOURCE_DOC_SYSID,
         EXEC=YES
      IF EE RETURN CODE IS 'OK', THEN
         SAVE NEW DCG(J) CONTROL FIELD
            VALUE 'DECREMENT CONTROL
            GROUP INDEX (J=J-1)
         INVOKE FREE RESULT BUFFER
            (FTRGC070)
      ELSE (EXPRESSION EVAL FAILED)
```

```
  SET ABORT_PROCESS CODE TO 'EXPRES-
    SION EVAL ERROR'
  TRANSFER TO ERROR PROCESSOR PGN
    -ALFTRGF-(XCTL)
  ENDIF
ENDDO
SAVE NEW RECORD DATA FOR NEXT
  GROUP SUMMARY
DO UNTIL (I) >MAX CONTROL GROUP
  LEVEL
  SET SOURCE DOCUMENT CURRENT
    PAGE TO RGWA_DCG(I)_TEXT_PAGE
    NAME
  CALL GENERATE DCG(I) TEXT OUTPUT
    -ALFTRGE-(CALL)
  SET SOURCE_DOCUMENT_CURRENT
    PAGE TO ZERO
  INCREMENT CONTROL GROUP INDEX
    (I=I+1)
  ENDDO
ENDSEGMENT FTRGC030 (PERFORM CON-
TROL BREAK) ENDPDL
```

The control system continues to cycle through the routine until the end of the record file is sensed at block 54. When this occurs a branch is taken to block 69 where the control group summary is generated in accordance with the routine shown in Table 4 and the file report summary is generated at block 70 in accordance with the program routine shown in Table 5. At this point processing is completed.

TABLE 4

```
BEGINPDL 010,010
  FTRGC040 (CALCULATE CGS(J) TOTALS)
INCLUDED SEGMENT
  FIND CGS 'TOT' INSTRUCTION COUNT
  IF 'TOT' INSTRUCTION COUNT>0, THEN
    SET 'TOT' INSTRUCTION INDEX (T=1) DO
    UNTIL (T)>'TOT' INSTRUCTION COUNT
    ACCESS CGS(J) TOTAL (T) ANN ACCUMU-
      LATOR NAME
    CALL GET CGS(J) TOTAL (T) EXPRESSION
      (GDOCDATA)
      SYSID=RGPL_WORK_DOC_SYSID,
      DATATYPE=ADJUNT,
      BUFUSE=NO,
      POPREQ=#,
      POPTNUM=RGWA)_TOTAL_SYMBOL
        NAME+1,
      POPSET=NO,
      PAGETYPE=FINAL,
      PAGESET=NO,
      PAGENAM=RGWA_CSG(J)_TEXT_PAGE
        NAME,
      PAGEVCE=NO,
      FP=0,
      EXEC=YES
    IF ANY INPUT PROCESS EXCEPTION,
      THEN SET ABORT_PROCESS_CODE TO
      'TEMP DOCUMENT INPUT ERROR'
    TRANSFER TO ERROR PROCESSOR PGN
      -ALFTRGF-(XCTL)
    ENDIF
    CALL EVALUATE 'ANN=ANN+EXPRES-
      SION'
      (PARSEEXP)
      ASSIGN=YES,
      CAPLIZE=NO,
      EXPTYP=(A,C,),
      EDITING=YES,
      EXPLEN=RGWA_TOTAL_LENGTH,
      EXPRESS=HAM_OUTPUT_BUFFER 1,
      PAFDSYS=RGPL_PARALLEL_FILE_DE-
        SCRIPTOR_SYSID,
      PRFDSYS=RGPL_PRIMARY_FILE_DE-
        SCRIPTOR_SYSID,
      SYMPAGE=RGPL_SYMBOLS_PAGE,
      SYMSYS=RGPL_WORK_DOC_SYSID,
      WORKBUF=WK_EXP_EVAL_WORK_BUF-
        FER@,
      KEYUPD=DISALLOW,
      EVAL=YES,
      PRREC@=RGPL_PRIMARY_RECORD
        ADDR,
      PAREC@=RGPL_PARALLEL_RECORD
        ADDR,
      MCDSYS'RGPL_SOURCE_DOC_SYSID,
      EXEC=YES
    IF EE RETURN CODE IS 'OK', THEN IN-
      CREMENT 'TOT' INSTRUCTION INDEX
      (T=T+1)
    ELSE (EXPRESSION EVAL FAILED)
      SET ABORT_PROCESS_CODE TO 'EX-
        PRESSION EVAL ERROR'
      TRANSFER TO ERROR PROCESSOR PGN
        -ALFTRGF-(XCTL)
    ENDIF
  ENDDO
  ENDIF
ENDSEGMENT FTRGC040 (CALCULATE
CGS(J) TOTALS) ENDPDL
```

TABLE 5

```
BEGINPDL 010,010
  FTRGC045 (CALCULATE FRS TOTALS) IN-
CLUDED SEGMENT
  SET 'TOT' INSTRUCTION INDEX (T=1)
  DO UNTIL (T)>'TOT' INSTRUCTION COUNT
    ACCESS FRS TOTAL (T) ANN ACCUMULA-
      TOR NAME CALL GET FRS TOTAL (T) EX-
      PRESSION (GDOCDATA)
      SYSID=RGPL_WORK_DOC_SYSID,
      DATATYP=ADJUNCT,
      BUFUSE=NO,
      POPREQ=#,
      POPTNUM=T,
      POPSET=NO,
      PAGETYP=FINAL,
      PAGESET=NO,
      PAGENAM=RGWA_FRS_TEXT_PAGE
        NAME,
      PAGEREQ=#,
      PAGEVCE=NO,
      FP=0,
      EXEC=YES
    IF ANY INPUT PROCESS EXCEPTION, THEN
      SET ABORT_PROCESS_CODE TO 'TEMP
      DOCUMENT INPUT ERROR'
    TRANSFER TO ERROR PROCESSOR PGN
      -ALFTRGF-(XCTL)
    ENDIF
    CALL EVALUATE 'ANN=ANN+EXPRES-
      SION' (PARSEEXP)
      ASSIGN=YES,
      CAPLIZE=NO,
      EXPTYP=(A,C),
```

```
EDITING=YES,
EXPLEN=RGWA_TOTAL_LENGTH,
EXPRESS=HAM_OUTPUT_BUFFER 1,
PAFDSYS=RGPL__PARALLEL__FILE__DE-
   SCRIPTOR_SYSID,
PRFDSYS=RGPL__PRIMARY__FILE__DE-
   SCRIPTOR_SYSID,
SYMSYS=RGPL_WORK_DOC_SYSID,
WORKBUF=WK_EXP_EVAL_WORK_BUF-
   FER@,
KEYUPD=DISALLOW,
EVAL=YES,
PRREC@=RGPL___PRIMARY___RECORD
   ADDR,
PAREC@=RGPL___PARALLEL___RECORD
   ADDR,
MCDSYS=RGPL_SOURCE_DOC_SYSID,
EXEC=YES
IF EE_RETURN_CODE IS 'OK', THEN INCRE-
   MENT 'TOT' INSTRUCTION INDEX
   (T=T+1)
ELSE (EXPRESSION EVAL FAILED) SET
   ABORT_PROCESS_CODE TO 'EXPRESSION
   EVAL ERROR'
   TRANSFER TO ERROR PROCESSOR PGN
   -ALFTRGF-(XCTL)
ENDIF
ENDDO
ENDSEGMENT FTRGC045 (CALCULATE FRS
TOTALS) ENDPDL
```

The operation of the text processing system control function will now be described with reference to a specific example of a document generated using the present invention. Referring now to FIG. 6, there is illustrated a draft of a desired report. To key the draft, the operator places the system in a "Create Document" mode. In creating the draft, the information for each record is formatted and grouped together by common fields in the same manner as is desired of the final report. In the example of FIG. 6, it is assumed that a file contains records for each customer sale by a salesman in a branch office. Each "sales record" contains the customer's name, salesman's name, salesman's territory number, and the amount of the sale. The desired report is to list each sale, grouped by salesman, report the total sales by a salesman and the total of all sales for the branch office. After the example has been drafted, the file report merge control document shown in FIG. 7 is created by editing the document to delete redundant repetitions in the example, inserting instructions to identify the sections of the report, replacing examples of field data with insertion instructions and adding total instructions. This is accomplished by the operator by controlling the processor 11 through the keyboard 10 to produce the appropriate display of text material on the display 14.

Referring to FIG. 7, the first instruction entered is the [FRP] instruction indicating the file report preface section of the document which includes data to be printed only one time. In the example, the text data included is the heading "Sales Analysis By Territory". This information is centered on the display using conventional text centering methods. On the next line, a define control group instruction [DCG] is entered specifying the territory number field as the control group field from the record file.

On the line following the [DCG] the operator enters the heading information which is to be generated for each group of sales for a salesman. This section starts with two carrier returns to provide the desired spacing. A line format change specified by the character F is performed to set a tab at column 48 for positioning the "Territory:" and "Order Total" titles. The title "Salesman:" is then entered followed by an insertion instruction for the SALESMAN name field, a tab to column 48, the title "Territory:" and an insertion instruction for TERRITORY NUMBER. The line is ended with a carrier return and another carrier return is entered for spacing and the "Account" and "Order Total" headings are entered and underscored.

The record detail section, which will be generated for each record selected from the file, is described next starting with a [RCD] instruction followed by a line format change code "F" to set a decimal tab at column 58 to cause decimal point alignment of the order total fields from each record. An insertion instruction is then entered for the ACCT NAME field followed by a tab and the insertion instruction for the ORDER AMOUNT.

Following the record detail section, the section describing totals for the group of records for a salesman is entered. The section begins with a control group summary [CGS] instruction which causes the section to be generated at the end of each group of records having the same territory number. Following the CGS instruction, a total instruction is entered to cause the order amount from each record to be accumulated into accumulator "A01". The "TOT" instruction causes no vertical escapement in the generated output so two carrier returns are entered for the desired spacing. Because the same decimal tab is to be used here as was used in the record detail section, no line format change is required. The summary line starts with a tab to the decimal tab column 58, followed by the title "Territory Total:" and the insertion instruction (INS). These characters move to the left as they are entered due to the decimal alignment but the generated output will be properly aligned. The title "Territory Total:" is entered as part of the "decimal alignment field" in order to make it "float" a fixed number of spaces in front of the total amount, regardless of the length of the inserted total.

Following the "CGS" section, a file report summary (FRS) section is specified in order to insert a grand total for all records selected. This section is similar to the prior one except that a line format change is performed to move the decimal tab from column 58 to column 68. The title is "Grand Total:" and accumulator A02 is used because A01 is cleared for each group.

Once the file report merge control document has been set up as shown in FIG. 7, the operator places the system in a "Use" mode and the control system scans the document to identify the sections described by the instructions. Each section present is copied into temporary working storage in the disk storage 16. This function is accomplished under the control of the file report source compiler shown in Table 6. The record data is then processed in accordance with the flow algorithm of FIG. 5 as was previously described to produce the report shown in FIG. 8.

TABLE 6

DESCRIPTIVE-NAME=FILE REPORT SOURCE COMPILER

FUNCTION=Processes a file report merge control document to isolate individual report group text components and store each component in a separate page of the merge file/text working document. These text pages are then available for actual report generation, being directly addressable and stripped of all file report control instructions.

This module determines the type of file report control instruction that is to be processed and calls either ALFTRGG which processes 'FRP', 'DCG', 'RCD' or ALFTRGH which processes 'CGS', 'FRS', 'TOT'.

File report control instructions are:
FRP = FILE REPORT PREFACE TEXT
DCG = DEFINE CONTROL GROUP, BEGIN GROUP TEXT
RCD = BEGIN RECORD DETAIL TEXT
CGS = BEGIN CONTROL GROUP SUMMARY TEXT
FRS = FILE REPORT SUMMARY TEXT
TOT = CALCULATE ACCUMULATE TOTAL Example implementation notes:

A file report merge control document is contained entirely on a single page (the first page of the document), and must adhere to one of the structures identified below:

| TEXT | | (TREATED AS RCD) |
|---|---|---|
| TEXT | | |
| (FRS) | STXT | |
| (FRP) | TEXT | |
| (FRP) | TEXT | |
| (DCG) | TEXT | (UP TO TWO ALLOWED) |
| (FRP) | TEXT | |
| (RCD) | TEXT | |
| (FRP) | TEXT | |
| (FRS) | STXT | |
| (FRP) | TEXT | |
| (DCG) | TEXT | (UP TO TWO ALLOWED) |
| (RCD) | TEXT | |
| (FRP) | TEXT | |
| (DCG) | TEXT | (UP TO TWO ALLOWED) |
| (CGS) | STXT | |
| (FRP) | TEXT | |
| (DCG) | TEXT | (UP TO TWO ALLOWED) |
| (FRS) | STXT | |
| (FRP) | TEXT | |
| (RCD) | TEXT | |
| (FRS) | STXT | |
| (FRP) | TEXT | |
| (DCG) | TEXT | (UP TO TWO ALLOWED) |
| (RCD) | TEXT | |
| (CGS) | STXT | (SAME NUMBER AS DCG'S) |
| (FRP) | TEXT | |
| (DCG) | TEXT | (UP TO TWO ALLOWED) |
| (RCD) | TEXT | |
| (FRS) | STXT | |
| (FRP) | TEXT | |
| (DCG) | TEXT | (UP TO TWO ALLOWED) |
| (CGS) | STXT | (SAME NUMBER AS DCG'S) |
| (FRS) | STXT | |
| (FRP) | TEXT | |
| (DCG) | TEXT | (UP TO TWO ALLOWED) |
| (RCD) | TEXT | |
| (CGS) | STXT | (SAME NUMBER AS DCG'S) |
| (FRS) | STXT | |
| (DCG) | TEXT | (UP TO TWO ALLOWED) |
| (DCG) | TEXT | (UP TO TWO ALLOWED) |
| (RCD) | TEXT | |
| (DCG) | TEXT | (UP TO TWO ALLOWED) |
| (CGS) | STXT | (SAME NUMBER AS DCG'S) |
| (DCG) | TEXT | (UP TO TWO ALLOWED) |
| (FRS) | STXT | |
| (DCG) | TEXT | (UP TO TWO ALLOWED) |
| (RCD) | TEXT | |
| (CGS) | STXT | (SAME NUMBER AS DCG'S) |
| (DCG) | TEXT | (UP TO TWO ALLOWED) |
| (RCD) | TEXT | |
| (FRS) | STXT | |
| (DCG) | TEXT | (UP TO TWO ALLOWED) |
| (CGS) | STXT | (SAME NUMBER AS DCG'S) |
| (FRS) | STXT | |
| (DCG) | TEXT | (UP TO TWO ALLOWED) |
| (RCD) | TEXT | |
| (CGS) | STXT | (SAME NUMBER AS DCG'S) |
| (FRS) | STXT | |
| (RCD) | TEXT | |
| (RCD) | TEXT | |
| (FRS) | STXT | |
| (FRS) | STXT | |

The following definitions apply:

| TEXT | = | ANY VALID TEXT DOCUMENT STRING (NO LIMIT) WHICH DOES NOT CONTAIN A FILE REPORT CONTROL INSTRUCTION. INTERPRETED AS RECORD DETAIL TEXT WHEN THE DOCUMENT DOES NOT BEGIN WITH A FILE REPORT CONTROL INSTRUCTION. |
|---|---|---|
| STXT | = | ANY VALID TEXT DOCUMENT STRING (NO LIMIT) WHICH DOES NOT C A FILE REPORT CONTROL INSTRUCTION, EXCEPT THIS STRING MAY CONTAIN ONE OR MORE 'TOT' INSTRUCTIONS. |
| (FRP) | = | A 'REPORT-LEVEL PREFACE' INSTRUCTION OF THE FORM '(FRP . . . )'. ONLY ONE OF THESE IS PERMITTED IN A FILE REPORT MERGE CONTROL DOCUMENT, AND THIS MUST BE THE FIRST FILE REPORT CONTROL INSTRUCTION IN THE DOCUMENT. |
| (RCD) | = | A 'RECORD DETAIL' INSTRUCTION OF THE FORM '(RCD . . . )'. ONLY ONE OF THESE IS PERMITTED IN A FILE REPORT MERGE CONTROL DOCUMENT. |
| (DCG) | = | AN X'TH LEVEL (X = 1, 2, . . . , M) 'DEFINE CTL GROUP' INSTRUCTION OF THE FORM '(DCG . . . ,BREAKNAME)', UP TO TWO MAY BE SPECIFIED IN A FILE REPORT MERGE CONTROL DOCUMENT. |
| (CGS) | = | AN X'TH LEVEL (X = 1, 2, . . . , M) 'CTL GROUP SUMMARY' INSTRUCTION OF THE FORM '(CGS . . . )'. IF USED, ONE OF THESE INSTRUCTIONS IS REQUIRED TO PAIR WITH EACH SPECIFIED (DCG) |

| | |
|---|---|
| INSTRUCTION. | |
| (FRS) = | A 'REPORT-LEVEL SUMMARY' INSTRUCTION OF THE FORM '(FRS . . . )'. ONLY ONE OF THESE IS PERMITTED IN A FILE REPORT MERGE CONTROL DOCUMENT, AND THIS MUST BE THE LAST FILE REPORT CONTROL INSTRUCTION IN THE DOCUMENT. |

As mentioned above, 'TOT' instructions may appear only in control group or report summary text-STXT. These instructions are of the form '(TOT . . . , ANN, EXPRESSION EDITCODE)' and, during each generation-time record detail process, the value of <EXPRESSION> is to be added to <ANN>. Compiler processing saves all information that is required for the summing operation.

While the invention has been particularly shown and described with reference to a preferred embodiment thereof, it should be understood by those skilled in the art, the certain changes in form and detail may be made therein without departing from the scope of the invention.

We claim:

1. A report generation control system for generating output reports containing inter-report summary data on a processor driven text processing system comprising:
   a processor and memory;
   Input means connected to said processor including,
   means for entering into the system an example report in the desired format including examples of fixed field text data and variable field file data,
   means for editing the example report for replacing said variable field file data with file data control instructions,
   means for editing said example report for inserting report summary instructions;
   means responsive to said input means for displaying the edited example report as a replica of the desired output report;
   and
   processor control means stored in said memory including,
   means for scanning the edited example report for file data control instructions and report summary instructions, and
   means responsive to said means for scanning for executing said file data control instructions and said report summary instructions and merging said fixed field text data and the results from executing said file data control instructions and said report summary instructions into an output report.

2. The report generation control system of claim 1 wherein said file data control instructions and report summary instructions are descriptive of the function to be performed.

3. The report generation control system of claim 1 or claim 2 wherein said input means includes means for inserting codes in said example report defining sections of the output report.

4. The report generation control system of claim 3 wherein said processor control means further includes means for compiling the instructions inserted in said edited example report to produce a processing routine for said output report.

5. The report generation control system of claim 4 wherein the format of said edited example report is the same as the format of the output report.

6. The report generation control system of claim 5 wherein said output report includes file report preface, define control group, record detail, control group summary, and file report summary sections.

7. The report generation control system of claim 6 wherein said Means for executing report summary instructions includes means for accumulating totals.

8. A method for producing an output report containing inter-report summary data using a processor driven text processing system comprising the steps of:
   (a) storing in said text processing system an example report in a desired format including examples of fixed field text data and variable field file data,
   (b) replacing said variable field file data with file data control instructions,
   (c) inserting report summary instructions in said example report,
   (d) displaying said example report, including said file data control instructions and said report summary instructions, as a replica of the desired output report,
   (e) scanning said example report for file data control instructions and report summary instructions,
   (f) executing said file data control instructions and said report summary instructions, and
   (g) merging said fixed field text data and the results from executing said file data control instructions and said report summary instructions to produce an output report in the same format as said stored example report.

9. The method for producing an output report of claim 8 wherein said steps of storing in said text processing system an example report includes storing codes in said example report defining sections of said output report.

* * * * *